(12) United States Patent
Rackin et al.

(10) Patent No.: US 7,987,487 B2
(45) Date of Patent: Jul. 26, 2011

(54) UNIVERSAL EXTERNAL MULTIMEDIA ADAPTER FOR USE IN A VEHICLE

(75) Inventors: Mark H. Rackin, Smyrna, GA (US);
Michael T. Burk, Peachtree City, GA (US); Bruce E. Kerkemeyer, Tyrone, GA (US)

(73) Assignee: Panasonic Automotive Systems Company of America division of Panasonic Corporation of North America, Peachtree City, GA (US)

( * ) Notice: Subject to any disclaimer, the term of this patent is extended or adjusted under 35 U.S.C. 154(b) by 972 days.

(21) Appl. No.: 11/639,816

(22) Filed: Dec. 15, 2006

(65) Prior Publication Data

US 2008/0144705 A1 Jun. 19, 2008

(51) Int. Cl.
*H04N 7/18* (2006.01)
*H04B 1/00* (2006.01)
(52) U.S. Cl. .................. 725/75; 725/74; 381/86
(58) Field of Classification Search ............. 725/74–75; 381/86
See application file for complete search history.

(56) References Cited

U.S. PATENT DOCUMENTS

| 6,038,248 | A | * | 3/2000 | Rabaeijs et al. | 375/130 |
| 6,151,354 | A | * | 11/2000 | Abbey | 375/211 |
| 6,990,208 | B1 | * | 1/2006 | Lau et al. | 381/86 |
| 2003/0215102 | A1 | * | 11/2003 | Marlowe | 381/77 |
| 2005/0239434 | A1 | * | 10/2005 | Marlowe | 455/345 |
| 2005/0281414 | A1 | * | 12/2005 | Simon et al. | 381/86 |
| 2007/0015485 | A1 | * | 1/2007 | DeBiasio et al. | 455/345 |

\* cited by examiner

*Primary Examiner* — William Trost, IV
*Assistant Examiner* — Gigi L Dubasky
(74) *Attorney, Agent, or Firm* — Laurence S. Roach

(57) ABSTRACT

A vehicle audio/video media system includes an adapter apparatus in electrical communication with an audio/video head unit. The adapter apparatus includes a digital input receiving digital audio/video content from an external source. A digital-to-analog converter is coupled to the digital input and converts the digital audio/video content into analog audio/video content. An output device is coupled to the digital-to-analog converter. The output device transmits the analog audio/video content to the audio/video head unit.

5 Claims, 4 Drawing Sheets

UNIVERSAL EXTERNAL MULTIMEDIA ADAPTER FOR USE IN A VEHICLE

BACKGROUND OF THE INVENTION

1. Field of the Invention

The present invention relates generally to vehicle entertainment/information systems and, more particularly, to an apparatus for enabling such systems to accommodate various sources of multimedia content.

2. Description of the Related Art

Many vehicles, such as automobiles, recreational vehicles, and trucks, include some type of communications bus for carrying video/audio content and commands to and from the vehicle's entertainment system. The entertainment system typically includes an audio device, such as a radio and/or compact disc player, and may also include a video device, such as a video screen, for conveying visual content. An external source of multimedia content, such as a digital audio player, may be connected to the communications bus to thereby enable the external content to be played back on the internal audio/video devices of the vehicle entertainment system. For example, audio content may be retrieved from the hard drive of a digital audio player that is connected to the vehicle's communications bus. An auxiliary port or jack dedicated to the particular type of digital audio player may be used to connect the digital audio player to the communications bus. The retrieved audio content may then be played back via the audio device and speakers of the vehicle's entertainment system.

There are, however, several limitations to known methods of connecting an external digital audio player to an entertainment/information ("infotainment") system of a vehicle. One problem is that the basic vehicle infotainment subsystem elements and architecture must be modified in order to add new capabilities or to accommodate new technologies. Such modifications are difficult to integrate into an existing vehicle design, and thus must typically be postponed one or more model years until the vehicle undergoes a redesign. That is, the major infotainment subsystem elements, such as head units, etc., must be redesigned in order to incorporate the new capabilities in an integrated manner.

An alternative to the vehicle redesign is for the consumer to purchase an aftermarket non-integrated product. However, such an aftermarket product is typically less functional and more costly that what could have been provided by the vehicle manufacturer. One specific scenario in which this comes into play is the case wherein a particular original equipment manufacturer (OEM) port or jack is capable of accommodating only one particular type of external digital audio player. Thus, if digital audio player technology changes, or if the user desires to use a different type of digital audio player, then a different aftermarket port or jack must be connected to the communications bus.

Neither the vehicle redesign option nor the aftermarket product option is attractive to the vehicle manufacturer and the dealer. The redesign option results in product proliferation, logistical problems in dealing with product mix, and more costly and less competitive products. The aftermarket product option results in loss of sales revenue to the vehicle manufacturer and dealer.

Another problem is that it is not possible to control the external digital audio player via the entertainment system and the communications bus. That is, it is only possible to manually control the digital audio player locally at its user interface to thereby cause the player to transmit audio content to the vehicle entertainment system via the communications bus.

What is needed in the art is a device that enables new technologies to be introduced into a vehicle infotainment system as upgrades or as "dealer-installed options" without burdening all new vehicles with significant infrastructure costs that may or may not be needed by every customer.

SUMMARY OF THE INVENTION

The present invention is directed to a multimedia adapter that is capable of accommodating bi-directional communication and control between an existing vehicle infotainment system and a wide variety of external sources of audio and video content.

The invention comprises, in one embodiment thereof, a vehicle audio/video media system including an adapter apparatus in electrical communication with an audio/video head unit. The adapter apparatus includes a digital input receiving digital audio/video content from an external source. A digital-to-analog converter is coupled to the digital input and converts the digital audio/video content into analog audio/video content. An output device is coupled to the digital-to-analog converter. The output device transmits the analog audio/video content to the audio/video head unit.

The invention comprises, in another embodiment thereof, a method of operating a vehicle audio/video media system, including coupling an adapter apparatus to an audio/video head unit. The adapter apparatus is provided with a digital input. The digital input is used to receive digital audio/video content from a first external source. A digital-to-analog converter is coupled to the digital input. The digital-to-analog converter is used to convert the digital audio/video content into first analog audio/video content. The adapter apparatus is provided with an analog input. The analog input is used to receive second analog audio/video content from a second external source. An output device is coupled to the digital-to-analog converter and to the analog input. Either of the first analog audio/video content and the second analog audio/video content is transmitted from the output device to the audio/video head unit.

The invention comprises, in yet another embodiment thereof, a vehicle audio system including an adapter apparatus in bi-directional electrical communication with an audio head unit. The adapter apparatus includes a digital interface receiving digital audio content from at least one external audio source and transmitting digital commands to the at least one external audio source. A digital-to-analog converter is coupled to the digital interface and converts the digital audio content into first analog audio content. An analog input receives second analog audio content from the at least one external audio source. An output device is coupled to the digital-to-analog converter and to the analog input. The output device transmits either of the first analog audio content and the second analog audio content to the audio head unit.

An advantage of the present invention is that new technologies and new capabilities may be added without having to modify the basic elements and architecture of the vehicle infotainment subsystem.

Another advantage is that new digital audio player technology may be accommodated, and different types of digital audio players may be used, without having to connect a different aftermarket port or jack to the communications bus.

Yet another advantage is that it is possible to control an external digital audio player via the entertainment system and the communications bus.

BRIEF DESCRIPTION OF THE DRAWINGS

The above-mentioned and other features and advantages of the invention will become more apparent to one with skill in the art upon examination of the following figures and detailed description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PRESENTLY PREFERRED EMBODIMENTS

Figure 1:
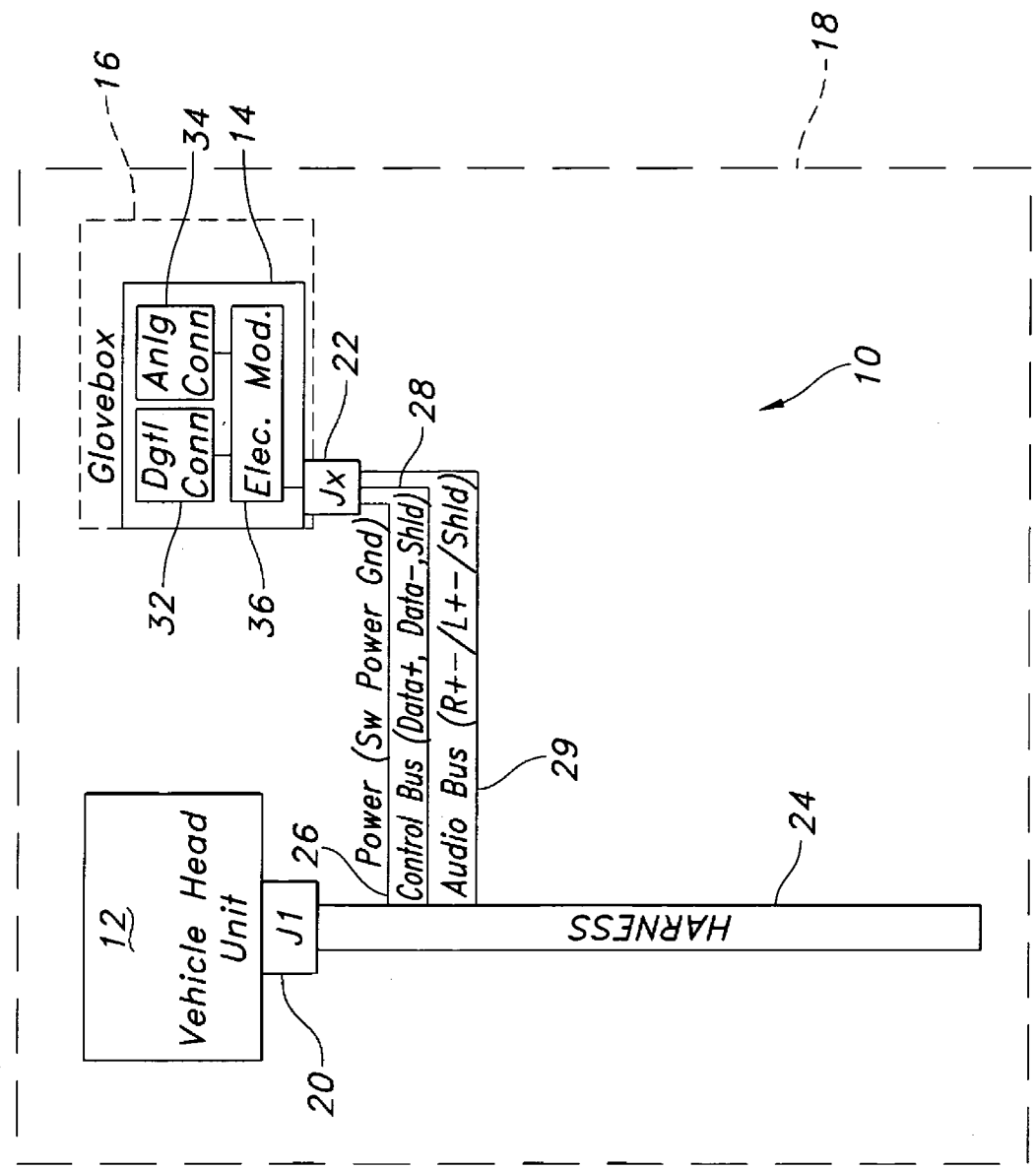
FIG. 1 is a block diagram of one embodiment of a vehicle audio/video media system of the present invention disposed within a vehicle.

Referring to FIG. 1, there is shown one embodiment of a vehicle audio/video media system 10 of the present invention including an audio/video head unit 12 in electrical communication with an adapter apparatus 14, which may be disposed within a glovebox 16 of an automobile 18. Head unit 12 may be electrically connected to adapter apparatus 14 via connectors 20, 22, wiring harness 24, power lines 26, control bus 28, and audio bus 29.

Head unit 12 has audio playback capability in the embodiment shown. It is also possible within the scope of the invention for head unit 12 to additionally or alternatively have video playback capability. For example, head unit 12 may include a radio receiver, a cassette player and/or a compact disc player for playing audio content. It is also possible for head unit 12 to include a video screen for display of video content, such as navigation maps.

Each of connectors 20, 22 may be any suitable connector including, for example, a ten or twelve pin connector. If desired, connectors 20, 22 may be compliant with standards that have been established by the United States Council for Automotive Research (USCAR). Wiring harness 24 may interconnect connector 20 with each of power lines 26, control bus 28 and audio bus 29.

Power lines 26 may include a Sw Power line and a ground (Gnd) line. Power lines 26 may be powered via a high-side switch within the head unit (not shown). In one embodiment, power lines 26 carry electrical power from head unit 12 to adapter apparatus 14 for powering the operation of adapter apparatus 14.

Control bus 28 may include two lines, i.e., may make use of two pins, and may be in the form of a controller area network (CAN) bus. Control bus 28 may include a balanced (differential) two-wire interface running over a ribbon cable, a shielded twisted pair (STP), or an unshielded twisted pair (UTP), for example.

Audio bus 29 may have four pins or wires used as two pairs; each pair may correspond to a respective one of two audio channels (right and left stereo channels; not shown in FIG. 1) that may be provided in vehicle 18. That is, each of the two pairs may carry a respective balanced audio signal corresponding to and determining the streams of audible content, e.g., sounds such as music or speech, that head unit 12 may cause to be played or broadcast on vehicle speakers. Alternatively, audio bus 30 may have three wires or pins, with one right and one left signal and a common signal. Audio bus 29 may also include an additional (fourth or fifth) pin for audio shielding purposes.

Adapter apparatus 14 may enable head unit 12 to receive audio and/or video content from, and exchange commands and signals with, multiple external sources of audio/video content. In the embodiment shown in FIG. 1, apparatus 14 includes a digital device connector 32 for connecting head unit 12 to an external source of digital audio/video content, such as an MPEG-1 Audio Layer 3 (MP3) player or a Windows Media Audio (WMA) player, or a compatible digital storage device containing the content to be played (e.g., a USB "memory stick"). Apparatus 14 also includes an analog device connector 34 for connecting head unit 12 to an external source of analog audio/video content, such as an iPod® portable audio player, produced by Apple Computer, Inc. of Cupertino, Calif.

Figure 2:
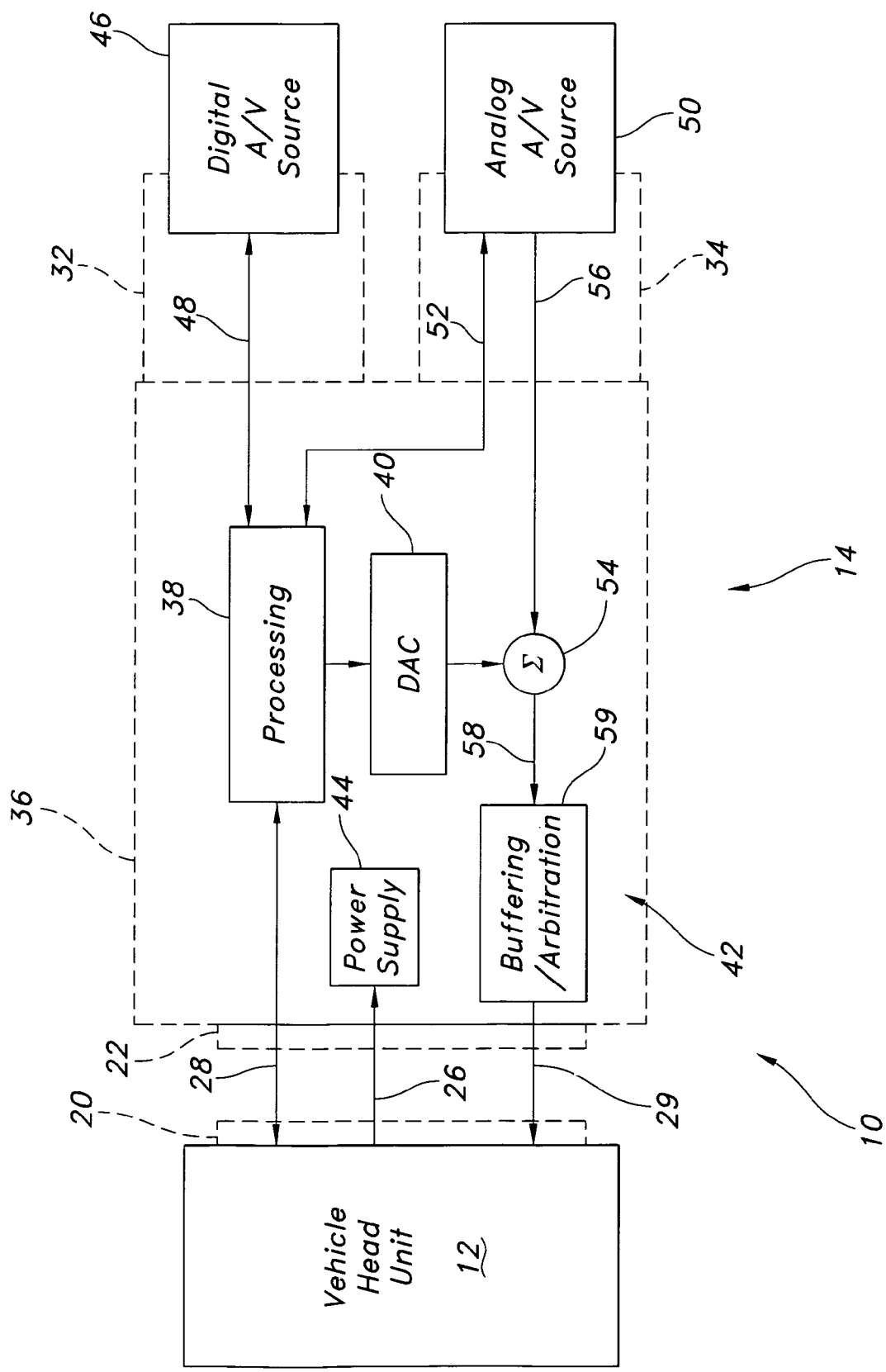
FIG. 2 is a more detailed block diagram of the vehicle audio/video media system of FIG. 1.

Apparatus 14 also includes an electronics module 36 for processing and transmitting content signals and commands between head unit 12 and the external sources of digital and analog audio/video content. Electronics module 36 electrically interconnects digital device connector 32 and analog device connector 34 with connector 22. As shown in FIG. 2, electronics module 36 may include a processing block 38, a two-channel (stereo) digital-to-analog converter (DAC) 40, an output device 42, and a power supply 44.

Processing block 38 may bi-directionally communicate commands to and from head unit 12. If digital audio/video source 46 is in the form of a player device that is capable of receiving and transmitting commands, then processing block 38 may also bi-directionally communicate commands to and from the digital player device via digital device connector 32 and a first digital input/output 48 of module 36. However, if digital audio/video source 46 is in the form of a passive device, such as a memory device, which is incapable of processing or transmitting commands, then processing block 38 may only retrieve digital content from source 46 without exchanging commands therewith. Processing block 38 may also bi-directionally communicate commands to and from an analog audio/video source 50 via analog device connector 34 and a second digital input/output 52 of module 36. Any or all of the commands received or transmitted by processing block 38 may be digital.

Processing block 38 may pass commands substantially unaltered between head unit 12 and one or both of digital audio/video source 46 and analog audio/video source 50. Alternatively, processing block 38 may translate or otherwise alter commands that block 38 receives such that the commands that block 38 transmits are in a format that is suitable for whichever of head unit 12, digital source 46 and analog source 50 is to be the recipient of the command. That is, the commands that processing block 38 transmits to sources 46, 50 may be dependent upon the commands that processing block 38 receives from head unit 12. Similarly, the commands that processing block 38 transmits to head unit 12 may be dependent upon the commands that processing block 38 receives from sources 46, 50. It is also possible for processing block 38 to be the final user or ultimate recipient of some commands. Processing block 38 may also be the originator of some commands.

In addition to receiving and/or transmitting commands via digital input/output 48, processing block 38 may also receive digital audio/video content signals from digital audio/video source 46 via digital input/output 48. In another embodiment, module 36 may include a separate digital input for reception of digital audio/video content signals from digital audio/video source 46.

In the embodiment shown in FIG. 2, head unit 12 is configured to receive audio/video content signals in analog form. Thus, electronics module 36 may convert digital audio/video content signals received from digital audio/video source 46 into analog form that is suitable to transmit to head unit 12. Specifically, processing block 38 may perform some processing on the digital content signals received from digital source 46 and then may transmit the processed digital content signals to DAC 40. DAC 40 converts the digital content signals into analog content signals and then transmits the analog content signals to an electronic signal adder 54 of output device 42. Adder 54 also receives analog content signals from analog audio/video source 50 via an analog input port 56 of module 36.

In order to prevent the analog content signals from sources 46, 50 from interfering with one another within adder 54, processing block 38 may send commands to sources 46, 50 to thereby cause only one of the two sources 46, 50 to transmit a content signal at any single point in time. That is, the commands from processing block 38 to sources 46, 50 may include instructions to prevent sources 46, 50 from transmitting content signals simultaneously. Thus, adder 54 may effectively combine the two streams of time-divided content signals from sources 46, 50 into a single analog content signal that is produced by adder 54 on a single output 58. Instead of using the above-described technique of time division, it is also possible for the signals from sources 46, 50 to be substantially confined to separate ranges of the frequency domain. Adder 54 could then receive the content signals from sources 46, 50 simultaneously, and the two signals could be later separated from each other based upon their different frequency ranges.

Output device 42 also includes a buffering/arbitration block 59 that receives the output of adder 54 and transmits substantially the same signal to audio bus 29. Buffering/arbitration block 59 may protect adder 54 from stray or transient voltages that may appear on audio bus 29.

Digital audio/video source 46 may be in the form of a memory device storing compressed audio files in various digital formats, such as MP3, WMA, or similar. The memory device may be a USB memory device, a secure digital (SD) memory device, or a "flash" memory card, for example. Digital audio/video source 46 may alternatively be in the form of any electronic device that is capable of emulating such a USB memory device, including many portable music or video player devices.

Analog audio/video source 50 may be in the form of an iPod® portable audio player, for example. Although audio/video source 50 may process content signals in digital form internally, audio/video source 50 may transmit the processed content signals in analog form. Such an analog transmission may have the advantage that it cannot be cloned, i.e., perfectly copied, and played back on another player device.

Electrical connections to power supply 44 have been omitted from FIG. 2 in order to simplify the illustration. However, it is to be understood that power supply 44 may supply electrical voltage to connector 22, digital device connector 32, analog device connector 34, processing block 38, DAC 40, digital audio/video source 46, analog audio/video source 50, adder 54 and/or buffering/arbitration block 59.

Figure 3:
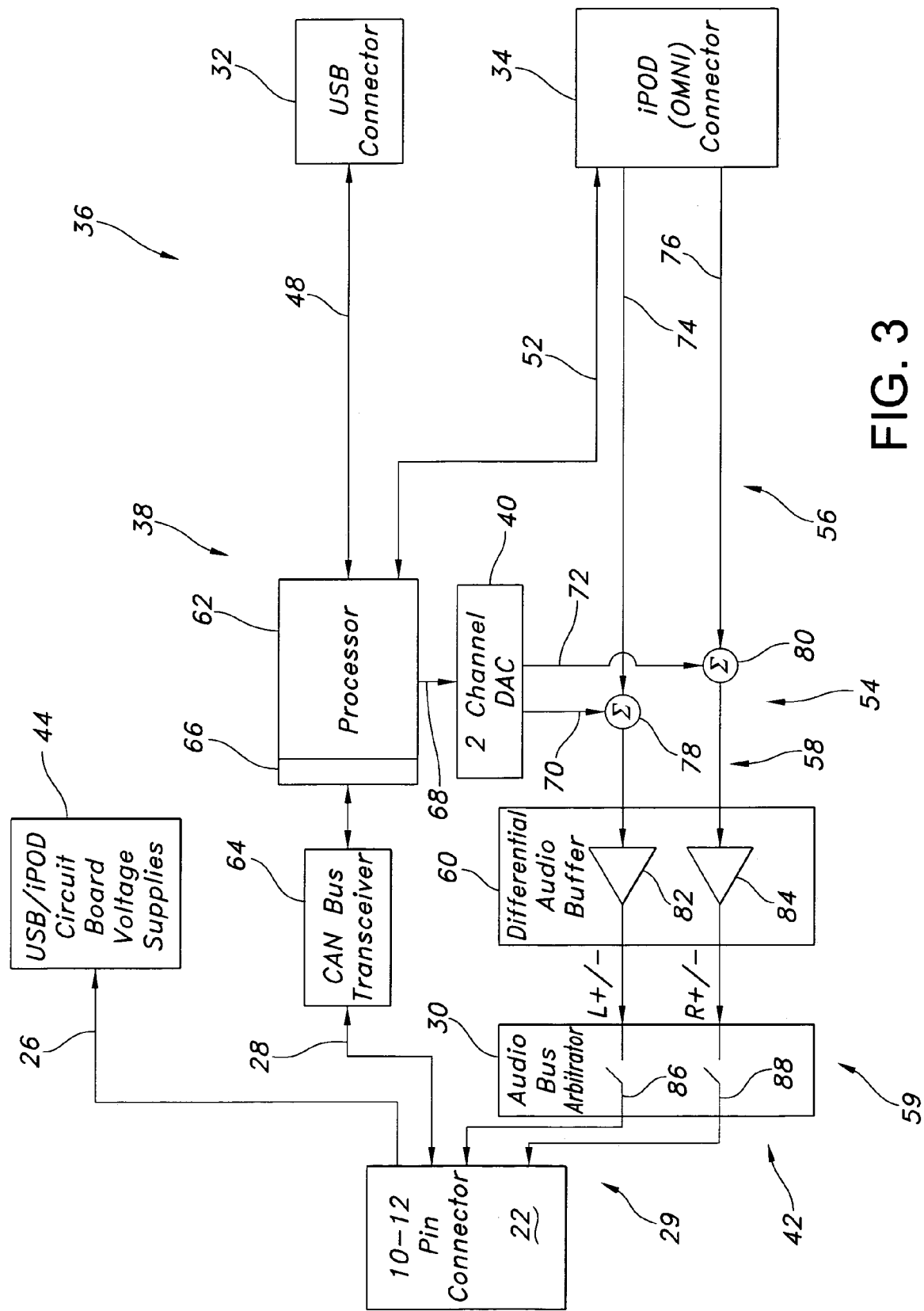
FIG. 3 is a block diagram of the adapter apparatus of the vehicle audio/video media system of FIG. 1.

FIG. 3 illustrates a more particular embodiment of electronics module 36 in which processing block 38 includes a processor 62, a CAN Bus transceiver 64, and a control/communications device in the form of a CAN Bus Interface 66. CAN Bus Interface 66 may enable processor 62 to interface with CAN Bus 28 through transceiver 64. Digital input/output 48 may be in the form of a digital interface that enables processor 62 to interface with a digital audio/video source. The digital audio/video source may be a USB memory stick connected to a digital connector 32 in the form of a USB connector. Processor 62 couples interface 48 to DAC 40 such that the digital content from the digital source may be decompressed or decoded, then transmitted to DAC 40 and converted to analog form therein.

Digital input/output 52 may be in the form of a Universal Asynchronous Receiver/Transmitter (UART) interface that enables processor 62 to communicate with an analog audio/video source. The analog audio/video source may be an iPod® connected to an analog connector 34 in the form of an iPod connector. The analog audio/video source could alternatively be an Omni portable media player marketed by Titan Global Entertainment of Miami, Fla.

Processor 62 may include an Inter-IC Sound (I2S) output 68 to DAC 40. I2S output 68 may handle audio data separately from clock signals. I2S output 68 may include three serial bus lines, namely a line with two time-division multiplexing (TDM) data channels, a word select line, and a clock line.

Processor 62 may also include MP3/WMA or other coder/decoders (codecs), which are not shown in the drawings. The codecs may be in the form of software running on processor 62 that performs data conversion. Such data conversion may be performed on commands and/or content signals that pass through processor 62, and may contribute to placing the commands and/or content signals into suitable form for reception by head unit 12, by the source of digital audio/video content, and/or by the source of analog audio/video content.

In the embodiment of FIG. 3, two different audio channels are used. More particularly, DAC 40 is in the form of a two-channel DAC including a left channel audio output 70 and a right channel audio output 72. Similarly, analog input port 56 of module 36 includes a left channel audio input 74 and a right channel audio input 76. In order to accommodate the left and right channels, adder 54 includes a left channel adder 78 and a right channel adder 80. Adder 78 adds the left channel signals on output 70 to the left channel signals on input 74, while adder 80 adds the right channel signals on output 72 to the right channel signals on input 76.

Buffering/arbitration block 59 may include a buffer 60 and an audio bus arbitrator 30. Buffer 60 may be in the form of a differential audio buffer including left and right analog stereo audio drivers 82, 84, respectively. Audio bus arbitrator 30 includes a left audio channel 86 and a right audio channel 88. Each of the left channel and the right channel may be further divided into separate signals for the front and rear speakers within the head unit or external power amplifier, such function being totally controlled by the head unit or external amplifier.

Audio bus 29 may utilize four or five pins of connector 22, which may have ten to twelve pins in the embodiment shown in FIG. 3. Specifically, audio bus 29 may utilize four separate pins for carrying a left+signal, a left−signal, a right+signal, and a right−signal, respectively. A fifth pin may possibly be utilized for an audio shield. Power lines 26 may utilize two pins for power and ground, and control bus 28 may utilize another two pins. Thus, in this embodiment, a total of eight or nine of the ten to twelve pins on connector 22 may be utilized.

Figure 4:
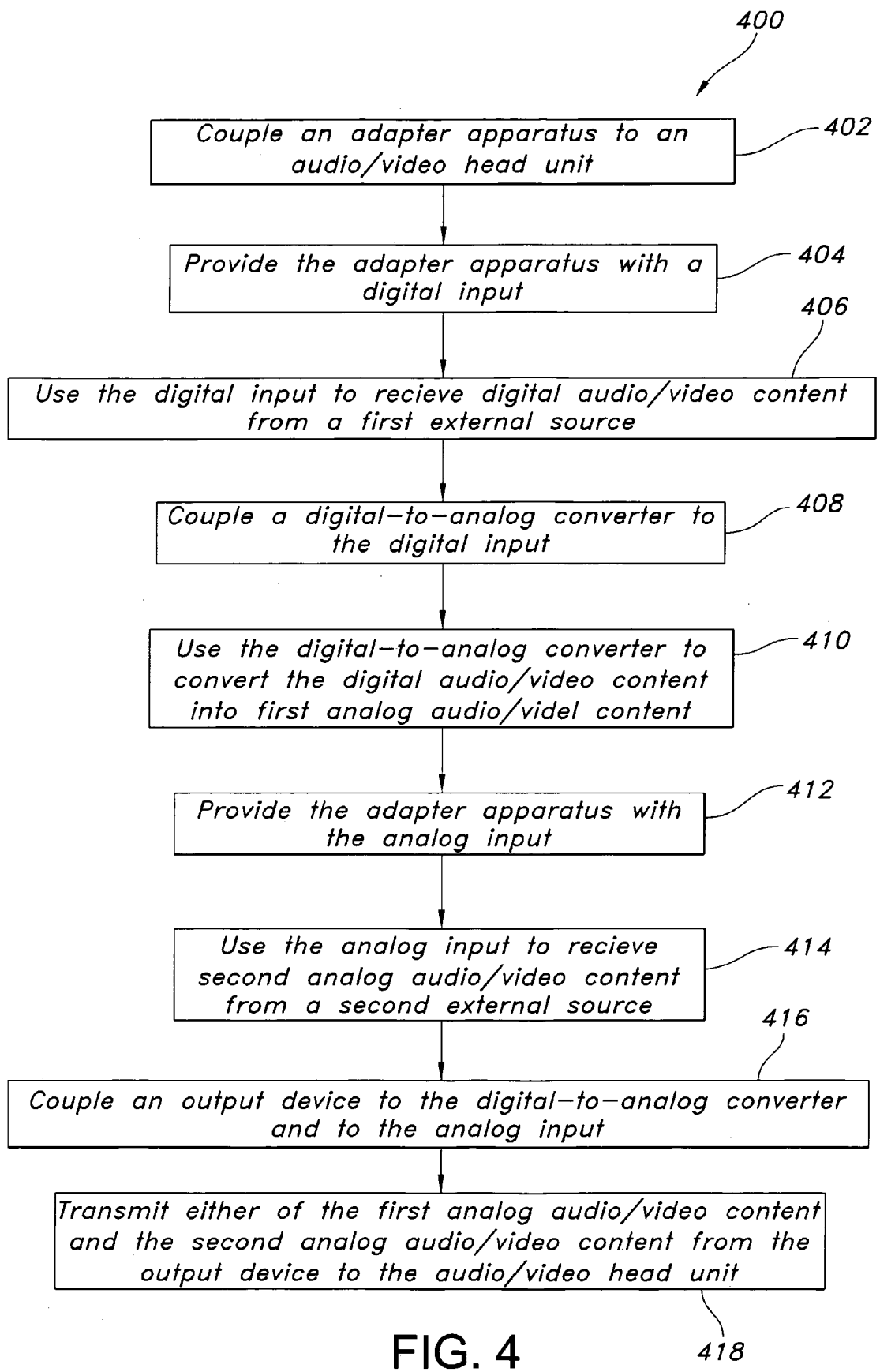
FIG. 4 is a flow chart of one embodiment of a method of operating a vehicle audio/video media system of the present invention.

FIG. 4 illustrates one embodiment of a method 400 of the present invention for operating a vehicle audio/video media system. In a first step 402, an adapter apparatus is coupled to an audio/video head unit. For example, adapter apparatus 14 may be coupled to audio/video head unit 12 via connectors 20, 22, wiring harness 24, power lines 26, control bus 28, and audio bus 29 (FIG. 1). In a next step 404, the adapter apparatus is provided with a digital input. More particularly, adapter apparatus 14 may be provided with a digital input 48 (FIG. 2). In step 406, the digital input is used to receive digital audio/video content from a first external source. In the embodiment of FIG. 2, processing block 38 may use digital input 48 to receive digital audio/video content from digital audio/video source 46. Next, step 408 includes coupling a digital-to-analog converter to the digital input. That is, DAC 40 may be coupled to digital input 48 by processor 62 (FIGS. 2 and 3). In step 410, the digital-to-analog converter is used to convert the digital audio/video content into first analog audio/video content. That is, DAC 40 may convert digital audio/video content from source 46 into analog audio/video content that is transmitted on outputs 70, 72 (FIG. 3). The adapter apparatus is provided with an analog input in step 412. For example, adapter apparatus 14 may be provided with an analog input port 56 (FIG. 2). In step 414, the analog input is used to receive second analog audio/video content from a second external source. In one embodiment, analog input port 56 is used by electronic adder 54 to receive analog audio/video content from analog audio/video source 50 (FIG. 2). In a next step 416, an output device is coupled to the digital-to-analog converter and to the analog input. In the illustrated embodiment, output device 42 is coupled to DAC 40 and to analog input port 56 (FIGS. 2 and 3). More particularly, left channel adder 78 of output device 42 is coupled to both output 70 of DAC 40 and to left channel audio input 74 of input port 56 (FIG. 3). Similarly, right channel adder 80 of output device 42 is coupled to both output 72 of DAC 40 and to right channel audio input 76 of input port 56 (FIG. 3). In a final step 418, either of the first analog audio/video content and the second analog audio/video content is transmitted from the output device to the audio/video head unit. Specifically, by use of buffering/arbitration block 59 (FIG. 2), the analog audio/video content from analog source 50 and/or the analog conversion of the digital audio/video content from digital source 46 may be transmitted to head unit 12 (FIG. 2).

Referring now back to FIGS. 2 and 3, module 36 may allow the user to make use of user interface capabilities that are native to player devices that are connected to connectors 32, 34, such as an MP3 player and/or an iPod®, for example. That is, the player devices that are connected to connectors 32, 34 may include control options such as song selection, language selection, menu navigation, playback speed, and setting of timers, for example. By virtue of commands that may be exchanged through module 36 between head unit 12 and the player devices, the user may use the knobs, levers and/or pushbuttons on head unit 12, and perhaps pushbuttons provided on the steering wheel, to control the same functions that the user could otherwise control via the user interfaces of the player devices.

Media system 10 is flexible enough to accommodate many different types of upgrades and modifications, which is advantageous when system 10 is permanently installed in a vehicle that may have a useful life in excess of ten years. An improved type of audio/video player, memory device, or communication device may be developed after system 10 has been installed in the vehicle, and the flexibility of system 10 allows that new technology to be utilized in conjunction with a modification of system 10. For example, if an upgraded audio/video player becomes commercially available after system 10 has been sold, the consumer may be able to accommodate the new technology by simply replacing adapter 14 with an upgraded or redesigned adapter that still interfaces to the head unit using the same mechanisms and protocols. The easy connectivity of connectors 32, 34, which is supported by electronics module 36, also enables upgraded memory devices and communication devices to be accommodated at minimal expense.

In the embodiments described above, a single processor handles both communication/control, i.e., decompression, and format conversion of digital content to analog content. However, it is alternatively possible within the scope of the invention for dedicated silicon devices to be used in combination with a small, inexpensive processor. Such a dedicated silicon device may be in the form of an MP3 decoder, for example.

It is also possible within the scope of the invention for the head unit to be provided with some form of higher-level connectivity. For example, the head unit could be connected to a true "multi-media bus", such as a Media Oriented Systems Transport (MOST) bus, that is capable of accommodating direct connection of devices that are designed to be compatible with the bus.

Electronics module 36 is described herein as being physically connected to the sources of content, such as through some type of electrical conductor. However, it is to be understood that it is also possible for an electronics module of the present invention to be in communication with sources of content through some wireless means. For example, the electronics module could communicate with the sources of content via Bluetooth/Multimedia, or some other wireless method or protocol. Advantageously, the flexibility of the present invention allows enhancements to be easily made, such as the addition of support for different compression methods such as advanced audio coding (AAC), etc., without requiring a complete redesign of the electronics module.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of operating an audio/video media system in a vehicle, comprising the steps of:
    coupling an adapter apparatus to an audio/video head unit;
    providing said adapter apparatus with a digital input;
    using said digital input to receive digital audio/video content from a first external source;
    coupling a digital-to-analog converter to said digital input;
    using said digital-to-analog converter to convert the digital audio/video content into first analog audio/video content, the first analog audio/video content being substantially confined to a first frequency range;
    providing said adapter apparatus with an analog input;
    using said analog input to receive second analog audio/video content from a second external source, the second analog audio/video content being substantially confined to a second frequency range different from the first frequency range;
    coupling an output device to said digital-to-analog converter and to said analog input;
    receiving the first analog audio/video content and the second analog audio/video content substantially simultaneously at the output device, wherein the first and second analog audio/video content are received simultaneously at, and are combined within, an adder;
    separating the first analog audio/video content and the second analog audio/video content from each other based upon their different frequency ranges; and
    transmitting either of the separated first analog audio/video content and the separated second analog audio/video content from said output device to said audio/video head unit, the transmitting step including transmitting either of the separated first analog audio/video content and the separated second analog audio/video content from said output device to an audio bus of said audio/video head unit via a buffering/arbitration device, the content passing through the buffering/arbitration device substantially unaltered, the method comprising the further step of using the buffering/arbitration device to protect the adder from stray or transient voltages on the audio bus.

2. The method of claim 1, comprising the further steps of:

transmitting first commands from said audio/video head unit to said adapter apparatus; and transmitting second commands from said adapter apparatus to at least one of said first external source and said second external source, said second commands being dependent upon said first commands.

3. The method of claim 1, comprising the further steps of:

providing a processor;

transmitting first commands from said audio/video head unit to said processor;

transmitting second commands from said processor to at least one of said first external source and said second external source;

transmitting third commands from said at least one of said first external source and said second external source to said processor; and transmitting fourth commands from said processor to said audio/video head unit; and wherein said second commands are dependent upon said first commands, and said fourth commands are dependent upon said third commands.

4. The method of claim 1, wherein the first and second analog audio/video content comprises first and second analog audio content and lacks video content.

5. The method of claim 1, wherein the first and second analog audio/video content are received simultaneously at a single line of the output device.

* * * * *